United States Patent
Katsumura

(10) Patent No.: US 8,379,338 B2
(45) Date of Patent: Feb. 19, 2013

(54) SYSTEM, METHOD, AND APPARATUS FOR PERFORMING METROLOGY ON PATTERNED MEDIA DISKS WITH TEST PATTERN AREAS

(75) Inventor: Yoshiteru Katsumura, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 250 days.

(21) Appl. No.: 12/871,156

(22) Filed: Aug. 30, 2010

(65) Prior Publication Data

US 2010/0321813 A1    Dec. 23, 2010

Related U.S. Application Data

(63) Continuation of application No. 11/857,074, filed on Oct. 22, 2007, now Pat. No. 7,813,075.

(51) Int. Cl.
*G11B 27/36* (2006.01)

(52) U.S. Cl. .......................................................... 360/31

(58) Field of Classification Search .................... 360/31, 360/77.04; 382/100; 428/659; 850/49
See application file for complete search history.

(56) References Cited

U.S. PATENT DOCUMENTS

| | | | |
|---|---|---|---|
| 6,204,989 B1 | 3/2001 | Hrinya et al. | |
| 7,706,100 B2 * | 4/2010 | Kawabe | 360/77.04 |
| 7,969,679 B2 * | 6/2011 | Mochizuki et al. | 360/31 |
| 8,073,188 B2 * | 12/2011 | Onishi et al. | 382/100 |
| 2002/0131187 A1 * | 9/2002 | Komine | 360/31 |
| 2010/0138964 A1 * | 6/2010 | Amos et al. | 850/49 |
| 2010/0215980 A1 * | 8/2010 | Sheinkman et al. | 428/659 |

* cited by examiner

*Primary Examiner* — Fred Tzeng

(57) ABSTRACT

Techniques for performing metrology on magnetic media disk formations that are arranged in curvilinear patterns are disclosed. Small integrated test patterns having rectangular periodicity are integrated among the concentric circles of patterned media formations. The test patterns cover only very small areas of the disk so as to not significantly affect disk capacity. The periodicity of the test patterns allows their formations to be more readily measured by metrology technology than those having a curvilinear periodicity.

24 Claims, 4 Drawing Sheets

SYSTEM, METHOD, AND APPARATUS FOR PERFORMING METROLOGY ON PATTERNED MEDIA DISKS WITH TEST PATTERN AREAS

This application is a continuation of U.S. patent application Ser. No. 11/857,074, filed Oct. 22, 2007, and is incorporated herein by reference in its entirety.

BACKGROUND OF THE INVENTION

1. Technical Field

The present invention relates in general to media disks and, in particular, to an improved system, method, and apparatus for performing metrology on the patterned magnetic media disks used in hard disk drives with integrated test pattern areas.

2. Description of the Related Art

Magnetic media such as the disks used in hard disk drives are typically constructed with concentric circular patterns of formations (e.g., lines, dots, etc.) that are on the order of nanometers in their dimensions. These formations on the patterned media must be qualified during manufacturing to ensure the quality and reliability of the product.

Patterned media may be evaluated with metrology technologies that utilize optical instruments based on spectroscopic ellipsometry or reflectometry. An alignment procedure typically is used for metrology and includes an additional pattern of one or more alignment marks. Alignment is required for pattern search and accurate measurement. These technologies precisely measure critical dimensions, sidewall angles, and multiple layer film thicknesses. The measurements are made on two-dimensional line and space structures, as well as three-dimensional hole and island structures. This technology produces accurate and precise models for production use of scatterometry results for both stand-alone and integrated metrology applications.

However, conventional metrology technologies only work in measuring formations that are arranged in rectilinear (e.g., rectangular, parallelogram-like, or hexagonal) patterns, rather than formations that have curvilinear periodicity such as those on magnetic media disks. In addition, the sizes of patterns, dots, and lines are too small to identify with the inspection techniques used by ellipsometry and x-ray refractivity. These techniques can only provide average dimensions for a periodic collection of islands. Moreover, SEM inspection techniques are slow, expensive and destructive to the sample being measured (i.e., because it requires the sample to be broken into smaller pieces, or because it contaminates the sample). This issue is becoming more significant as the data density (e.g., bits/nm$^2$) in disk drives continues to increase.

As shown in FIG. 1, the regularity of features on magnetic media disks varies according to the radial position of the sample being analyzed on the surface of the disk due to the concentric circular patterns. For example, at sample 11, which is a laser spot having a diameter of 50 µm located at a radial distance of 0.3 inches from the disk center 13, the radius of curvature of the pattern of formations is far more pronounced than at sample 15, which is located at a radial distance of 1.25 inches from the disk center 13. Although current measurement technologies provide adequate metrology for some rectilinear formation patterns, they are not as well suited for curved formation patterns such as those in samples 11 and 15. Thus, an improved solution for measuring features that are arranged in curvilinear patterns would be desirable.

SUMMARY OF THE INVENTION

Embodiments of a system, method, and apparatus for improving the metrology of formations and features on patterned media disks for disk drives are disclosed. The disks are provided with a measurement assistance tool comprising small, integrated test pattern areas. In one embodiment, the test patterns are formed with and interspersed among the concentric circles of patterned media used for data storage on the surface of the disks. Unlike the curvilinear patterns of formations, the test pattern areas may be arranged in rectangular, parallelogram or hexagonal patterns. Since some embodiments of the test pattern areas are not usable for data storage, the test pattern areas cover only very small areas of the disk so as to not significantly affect disk capacity. The formations in the test pattern areas are more readily measured by metrology technology than those formations having curvilinear periodicity, which makes the qualification of media disks in manufacturing non-distractive, easier and faster.

In one embodiment, the test pattern areas may be formed as blanket film patterns or featureless pads, which are well suited for film characterizations of thickness, density, and composition. Latticed dot patterns address metrology parameters of pattern size characterizations, including critical dimensions, height, angle, roughness, and rounding of those features. The trimming of latticed dot patterns, or the introduction of empty rows or spaces, addresses on the more high resolution patterns. This has the effect of lowering the density of features and enabling better measurements for some applications. In addition, solid lines and spaces assist in characterizing track patterns, discrete track, and pre-patterned servo patterns, including critical dimensions, height, angle, roughness, and rounding of those features. The addition of these kinds of patterns in selected small areas of the disks enables good measurements to be taken for better process control.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
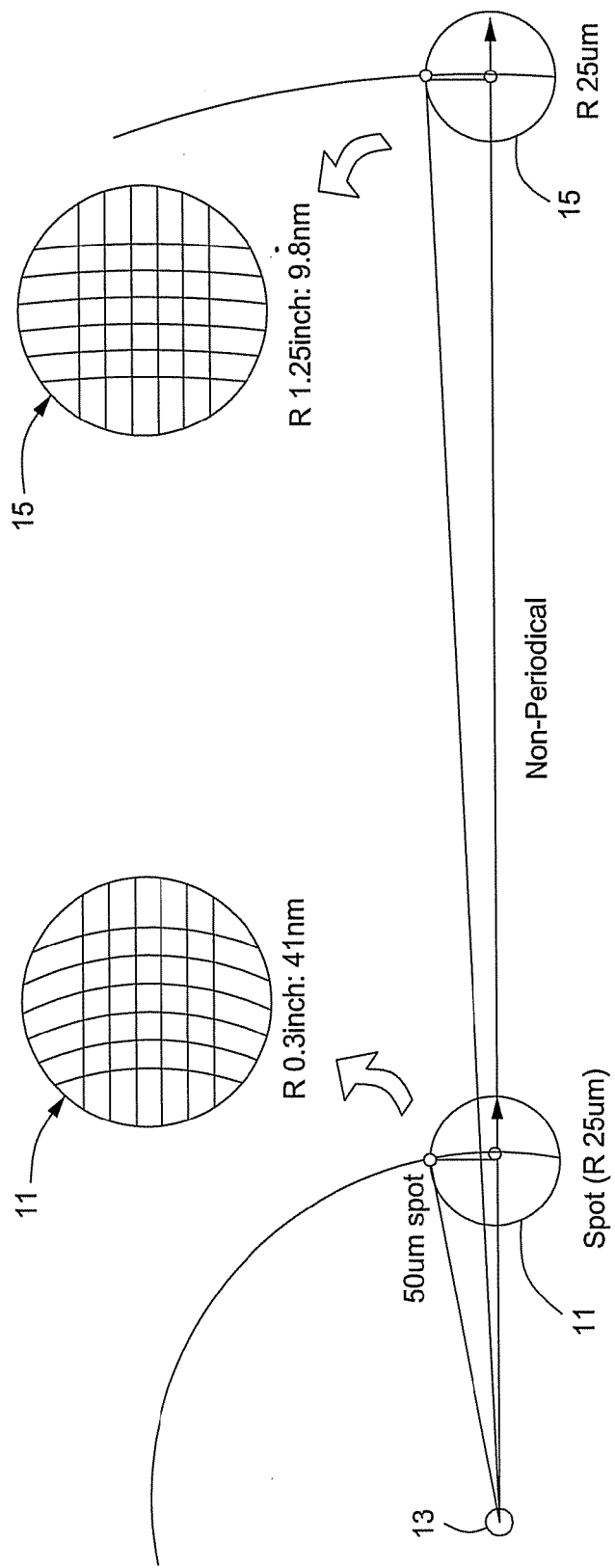
FIG. 1 is a schematic diagram of a patterned disk surface illustrating the variance in periodicity of formations formed thereon.
Figure 2:
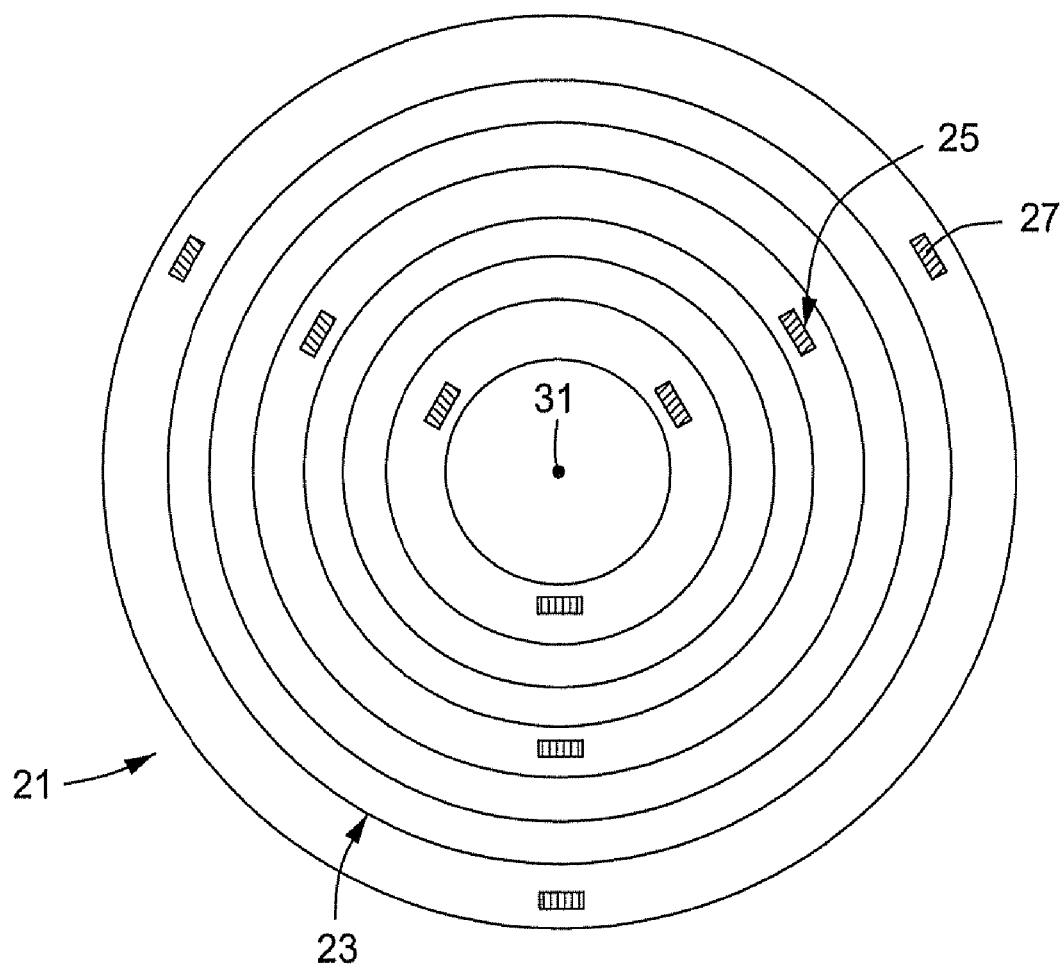
FIG. 2 is a schematic diagram of one embodiment of a magnetic media disk having test patterns constructed in accordance with the invention.
Figure 3:
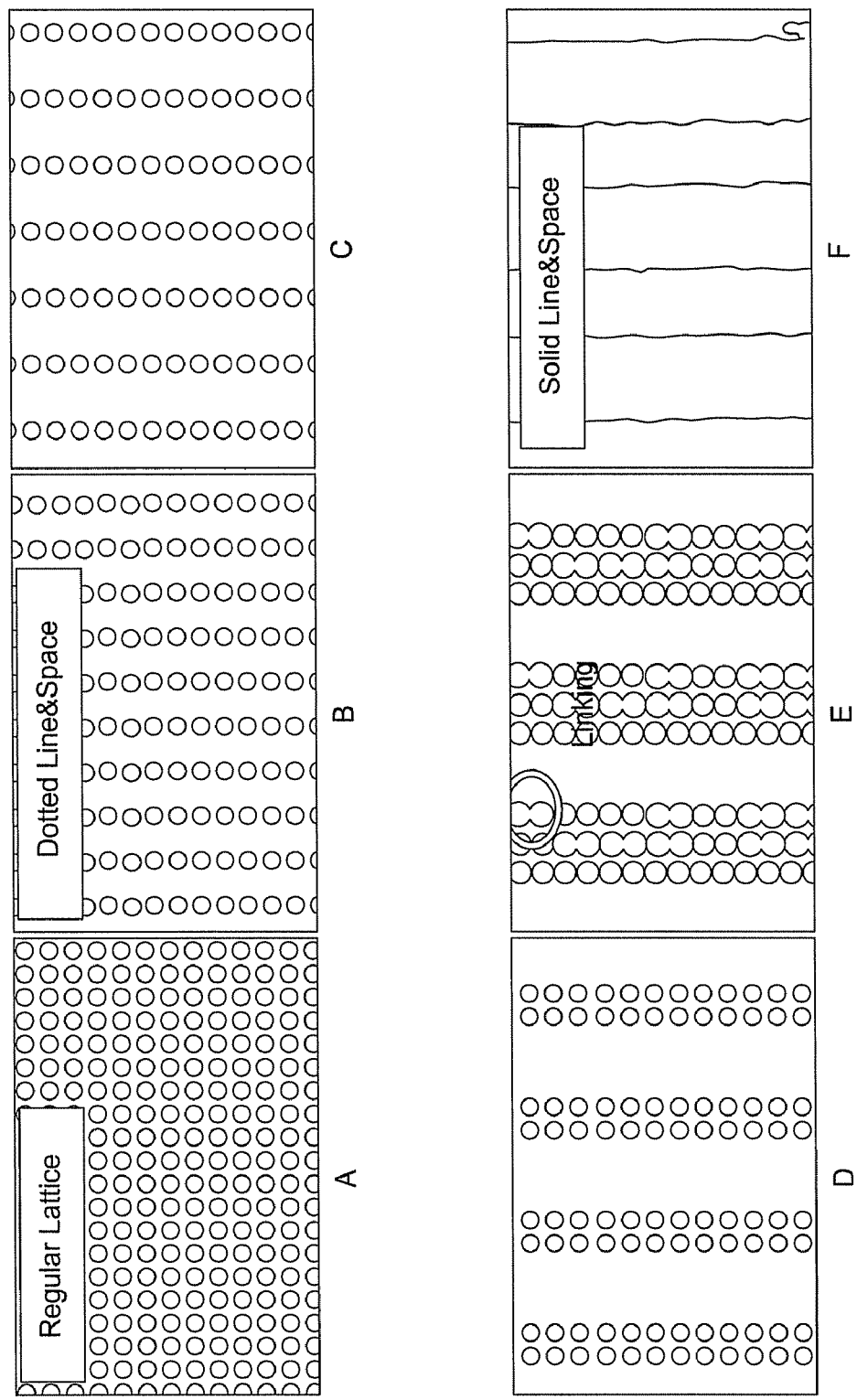
FIGS. 3A-F are illustrations of various embodiments of formations and patterns of the test patterns of FIG. 2 and are constructed in accordance with the invention.

Referring to FIGS. 2 and 3, embodiments of a system, method, and apparatus for improving the metrology of formations and features on patterned media disks for disk drives are disclosed. As schematically diagramed in FIG. 2, a data storage disk 21 comprises a substrate having a large plurality of data storage formations 23 (e.g., lines, dots, etc.) of magnetic media configured with a curvilinear periodicity. In addition, the disk may be provided with measurement areas that are featureless (i.e., no lines or dots), which are useful for measuring film thickness. Featureless areas also are useful for manufacturing process control since the film thickness relates to the height of the formations.

The data structures 23 may comprise circular tracks of magnetic islands, each of which typically comprises a small pillar of material. In some fabrication methods, a pillar is formed on the substrate by printing, lithography and etching, imprint lithography, electron beam lithography, etc., and magnetic material is blanket-deposited over the pillars, leaving some on top of the pillars and some in the trenches surrounding them. The magnetic material on the tops of the pillars serves as the isolated magnetic islands that are used for data storage on patterned media.

In other fabrication methods, a full film of magnetic material is deposited on the disks. The film is then lithographically patterned and etched to remove material between islands, leaving islands of magnetic film with no magnetic material between the islands. Regardless of which method is used, it is important during manufacturing to have good process control so that the target dimensions can be maintained consistently. This requires quick measurement of representative critical dimensions, and then making adjustments to manufacturing equipment based on the information gathered.

Some of the dimensions that are measured include: (1) island diameter (or length, width, etc., if not exactly circular); (2) island height; (3) island sidewall slop; (4) any rounding of the edges of the island (which is an undesirable result that can happen in etching).

For manufacturing process control, there is no need to measure every island. Representative measurements are sufficient to provide an average of performance information. There may be variations over different regions of the disk since the equipment does not always etch uniformly over the entire surface. Thus, it is important to measure a disk in several representative areas of the disk. Advanced optical scatterometry, optical ellipsometry, and various x-ray techniques can be used for this purpose. None of these techniques can measure the dimensions of a single island. However, if a periodic array of islands is provided, they can provide average dimension information about the collection of islands within the spot size of the measurement, which will typically be at least a few μm in diameter up to approximately one mm, depending on the technique used.

Again referring to FIG. 2, the disk 21 also is configured with one or more very small test areas 25 of test formations 27 (shown greatly exaggerated in size). In one embodiment, the test areas 25 are formed with and integrated into the curvilinear periodicity of the data storage formations 23 as shown. However, unlike the data storage formations 23, some embodiments of the test formations 27 are configured with a rectilinear periodicity for facilitating metrology of the test formations 27 and the data storage formations 23. For example, the rectilinear periodicity may comprise rectangular, parallelogram-like, or hexagonal patterns. Thus, the test formations are uniquely patterned magnetic media that is mixed in with the regular magnetic media that is used for data storage. The test areas may or may not be used for data storage depending on the application.

In one embodiment, the substrate has a radial center 31, the curvilinear periodicity of the data storage formations 23 comprises a plurality of concentric circular patterns that are arrayed about the radial center 31. The test areas 25 are symmetrically interspersed in the curvilinear periodicity. The test areas 25 may be arrayed in a plurality of spokes (e.g., three shown in FIG. 2) that extend radially from the radial center 31, and each test area may be configured with a rectangular perimeter.

In other embodiments, the test areas of test formations may comprise other types of physical structures on the disk. The physical structures may comprise topographic features in a dielectric film. Alternatively, they may be a magnetic layer etched into islands, which will then also look like topographic patterns. In another embodiment, the physical structures comprise a patterned magnetic layer with a conformal overcoat that allows the topography to "show through" to the surface of the overcoat. These various embodiments enable measurements to be taken at various points in the fabrication process of the disks, depending on the fabrication process chosen.

The test areas also may comprise many different types and combinations of features and formations. For example, as shown in FIG. 2, the test areas may comprise featureless pads in blanket film patterns for film characterizations of thickness, density, and composition. As shown in FIGS. 3A-E, the test areas also may comprise latticed dot patterns for pattern size characterizations of critical dimensions, height, angle, roughness, and rounding. The latticed dot patterns may be trimmed to form empty rows and spaces for measuring high resolution patterns, or the test areas may be configured with other types of empty rows and spaces.

In FIG. 3E, the "linked" dots are not linked intentionally. This is an example of a process control problem that can be measured and then corrected by using the present invention. Measurements of the average dimensions of the islands in the test pattern can reveal that linking is occurring, and the process can be altered to correct this problem on subsequent disks being manufactured.

In addition to the dense, regular lattice pattern shown in FIG. 3A, which is representative of the arrangement and density of features in the data areas, numerous other simplified or less dense patterns also may be used. The reason for this is that optical scatterometry has some difficulty with dense patterns because of the very small island sizes being examined, which are at the fringes of what scatterometry can properly measure. In addition, more sparsely populated patterns give additional information that facilitates the measurement process. For example, the patterns shown in FIGS. 3B through 3E have lower densities and provide additional information that assists in characterization of average island dimensions.

FIG. 3F depicts a pattern that also can be used in this manner. It is suitable for the purposes described above, and for characterizing the line features (which are also included in sector header regions of the data area of the disk) for average dimensions and line edge roughness, which also are of interest. For example, these test areas may comprise solid lines and spaces that also may be used for characterizing track patterns, discrete track, and pre-patterned servo patterns of critical dimensions, height, angle, roughness, and rounding.

Figure 4:
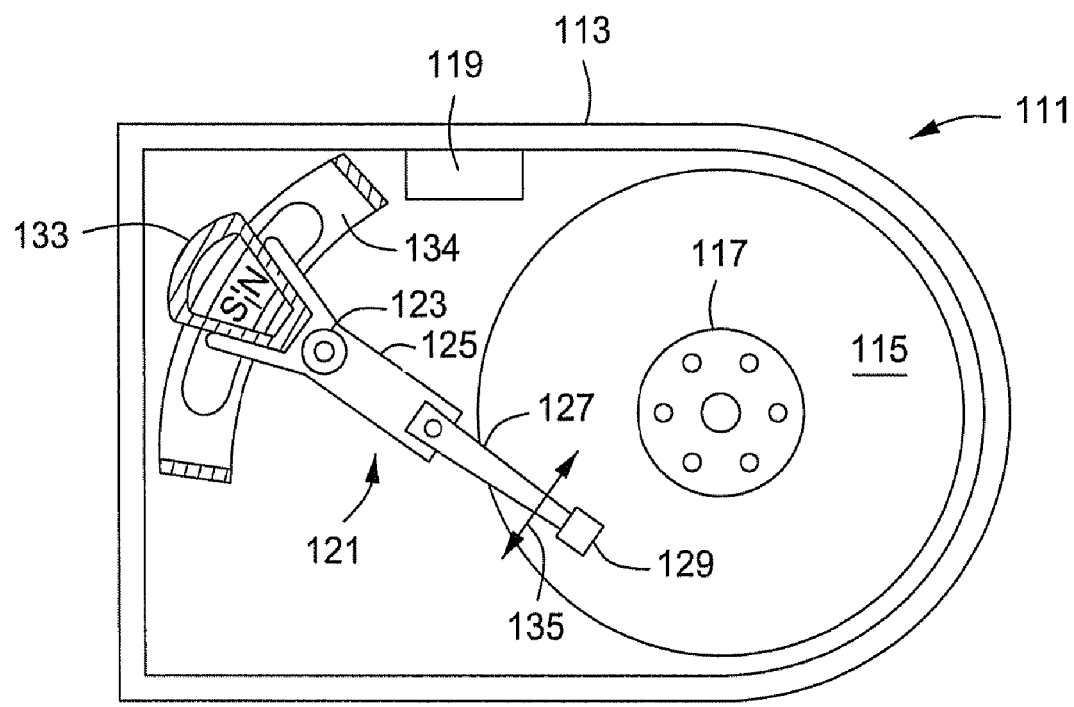
FIG. 4 is a schematic diagram of one embodiment of a disk drive constructed in accordance with the invention.

Referring now to FIG. 4, a schematic drawing of one embodiment of an information storage system comprising a magnetic hard disk file or drive 111 for a computer system in accordance with the invention is shown. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

Suspensions 127 have a spring-like quality, which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

While the invention has been shown or described in only some of its forms, it should be apparent to those skilled in the art that it is not so limited, but is susceptible to various changes without departing from the scope of the invention.

What is claimed is:

1. A data storage disk, comprising:
    a substrate having data storage formations of media configured with a curvilinear periodicity, and the data storage formations have a plurality of physical features;
    a test area of test formations on the substrate and integrated in the curvilinear periodicity, the test formations being configured with a physical feature that differs from the plurality of physical features of the data storage formations for facilitating measurement of the test formations and data storage formations; and
    the test area is incapable of data storage.

2. A data storage disk according to claim 1, wherein the substrate has a radial center, the curvilinear periodicity comprises a plurality of concentric circular patterns arrayed about the radial center, and the test area comprises a plurality of test areas that are interspersed among the concentric circular patterns.

3. A data storage disk according to claim 2, wherein the test areas are arrayed in a plurality of spokes that extend radially from the radial center.

4. A data storage disk according to claim 1, wherein the test formations are configured with a rectilinear periodicity that comprises one of rectangular, parallelogram and hexagonal patterns.

5. A data storage disk according to claim 1, wherein the test area is a featureless pad in a blanket film pattern for film characterizations of thickness, density, and composition.

6. A data storage disk according to claim 1, wherein the test area is a latticed dot pattern for pattern size characterizations of critical dimensions, height, angle, roughness, and rounding.

7. A data storage disk according to claim 6, wherein the latticed dot pattern is trimmed to form empty rows and spaces for measuring high resolution patterns.

8. A data storage disk according to claim 1, wherein the test area has empty rows and spaces for measuring high resolution patterns.

9. A data storage disk according to claim 1, wherein the test area has solid lines and spaces for characterizing track patterns, discrete track, and pre-patterned servo patterns of critical dimensions, height, angle, roughness, and rounding.

10. A data storage disk according to claim 1, wherein the test formations comprise topographic features in a dielectric film.

11. A data storage disk according to claim 1, wherein the test formations comprise a magnetic layer etched into islands.

12. A data storage disk according to claim 1, wherein the test formations comprise a patterned magnetic layer with a conformal overcoat.

13. A hard disk drive, comprising:
    an enclosure;
    a data storage disk rotatably mounted to the enclosure, the data storage disk comprising a substrate having data storage formations of media configured with a curvilinear periodicity, a test area of test formations of media on the substrate and integrated in the curvilinear periodicity, and the test area is incapable of data storage; and
    an actuator movably mounted to the enclosure, the actuator having a transducer for reading data from the data storage disk.

14. A hard disk drive according to claim 13, wherein the substrate has a radial center, the curvilinear periodicity comprises a plurality of concentric circular patterns arrayed about the radial center; and
    the test area comprises a plurality of test areas that are interspersed among the concentric circular patterns with the test areas being arrayed in a plurality of spokes that extend radially from the radial center.

15. A hard disk drive according to claim 13, wherein the test formations are configured with a rectilinear periodicity to facilitate measurement of the test formations and data storage formations.

16. A hard disk drive according to claim 15, wherein the rectilinear periodicity comprises one of rectangular, parallelogram and hexagonal patterns.

17. A hard disk drive according to claim 13, wherein the test area is one of:
    a featureless pad in a blanket film pattern for film characterizations of thickness, density, and composition; and
    a latticed dot pattern for pattern size characterizations of critical dimensions, height, angle, roughness, and rounding, and the latticed dot pattern is trimmed to form empty rows and spaces for measuring high resolution patterns.

18. A hard disk drive according to claim 13, wherein the test area has one of:
    empty rows and spaces for measuring high resolution patterns; and
    solid lines and spaces for characterizing track patterns, discrete track, and pre-patterned servo patterns of critical dimensions, height, angle, roughness, and rounding.

19. A method of measuring formations on a disk for a hard disk drive, comprising:
    (a) forming data storage formations of media on the disk;
    (b) configuring the data storage formations of media with a curvilinear periodicity;
    (c) forming a test area of test formations of media on the disk, the test area being incapable of data storage;
    (d) integrating the test area in the curvilinear periodicity for facilitating measurement of the test formations and data storage formations.

20. A method according to claim 19, wherein the disk has a radial center, the curvilinear periodicity comprises a plurality of concentric circular patterns arrayed about the radial center, the test area comprises a plurality of test areas that are interspersed among the concentric circular patterns, and the test areas are arrayed in a plurality of spokes that extend radially from the radial center.

21. A method according to claim 19, further comprising configuring the test formations with a rectilinear periodicity.

22. A method according to claim 21, wherein the rectilinear periodicity comprises one of rectangular, parallelogram and hexagonal patterns.

23. A method according to claim 19, wherein the test area is one of:

a featureless pad in a blanket film pattern for film characterizations of thickness, density, and composition; and a latticed dot pattern for pattern size characterizations of critical dimensions, height, angle, roughness, and rounding, and the latticed dot pattern is trimmed to form empty rows and spaces for measuring high resolution patterns.

24. A method according to claim 19, wherein the test area has one of:

empty rows and spaces for measuring high resolution patterns; and solid lines and spaces for characterizing track patterns, discrete track, and pre-patterned servo patterns of critical dimensions, height, angle, roughness, and rounding.

* * * * *